Nov. 17, 1964   H. E. NIMKE ETAL   3,156,939
COMPOSITE PLOW CONSTRUCTION
Filed June 30, 1960   2 Sheets-Sheet 1

INVENTORS: HELMUT E. NIMKE
ALEXANDER H. MC PHEE
THOMAS H. REID

BY Hugh S. Wertz
ATTORNEY

Nov. 17, 1964     H. E. NIMKE ETAL     3,156,939
COMPOSITE PLOW CONSTRUCTION
Filed June 30, 1960     2 Sheets-Sheet 2

INVENTORS: HELMUT E. NIMKE
ALEXANDER H. MC PHEE
THOMAS H. REID
BY
Hugh S. Wertz
ATTORNEY

United States Patent Office 3,156,939
Patented Nov. 17, 1964

3,156,939
COMPOSITE PLOW CONSTRUCTION
Helmut E. Nimke, Brooklyn, Alexander H. McPhee, Manhasset, and Thomas H. Reid, Brooklyn, N.Y., assignors to Hepworth Machine Company, Inc., Long Island City, N.Y., a corporation of New York
Filed June 30, 1960, Ser. No. 39,875
2 Claims. (Cl. 15—246.5)

This invention relates to unloading arrangements for centrifugal machines and more specifically to plow structures therefor.

It is a general object of this invention to provide improved unloading arrangements for centrifugal machines for processing sugar and other solids from solid-bearing solutions.

Unloaders for centrifugal machines of the sort just mentioned are well known. A suitable type includes a plow which bites into the sugar wall built up on the inside of the basket of the machine during the centrifuging process. The plow is attached to the lower end of a vertical rod which is moved vertically by any suitable means to move the plow up and down within the basket. The vertical rod is mounted in a framework which pivots about a vertical shaft making it possible to move the plow into and out of the sugar.

On some occasions, due to improper use of the plow, the plow becomes jammed against the basket, or too deeply imbedded in the sugar wall, or the rate of plowing is too great for the strength of the system which includes the plow, the parts moving it, and the basket. Any one of these happenings can cause breakage of one or more of the parts of this system. As the basket and the screen lining it are very expensive, the plow is usually designed in such a way that it will break before causing extensive damage to the basket or its lining.

It is another object of this invention to minimize the cost of breakages caused by improper plowing and more specifically to provide for maximum economy of plow replacements.

These and related objects are attained in accordance with the invention by providing a composite plow made up of a hub member and a shaped plow member. The customary plow tip is attached to the plow member. The hub member is made of a strong material, such as steel, since it is not a wearable or expendable part. The plow member is made the weakest structural link in the plowing system and consists of a casting in which no machine work is required. A suitable material is cast iron.

The plow is subjected to two types of forces, the first, a radial thrust imposed along a line connecting the plow tip with the center of the vertical plow rod and the second, upward and downward axial forces relative to the plow rod, in line with the long front edge of the plow tip as it moves up or down the sugar wall in the basket. The first force must be properly resisted at the hub by the plow rod without relative motion between the two parts and this is accomplished by providing contacting surfaces for the two parts arranged in planes at an angle to the radial force. The second force, which tends to bend the plow about a line of rotation substantially perpendicular to and through the center of a surface of the plow member which is connected to the hub member, is resisted by providing two additional contact faces on each of the hub and plow members all of which faces are arranged at an angle to this line of rotation and to the connecting surface of the plow member.

This arrangement also permits accurate alignment of the elements at assembly, either in the shop or field. Since all of the contacting faces are planes, they can be accurately cast and do not require a machine finish.

The invention will be more readily understood by referring to the following description taken in connection with the accompanying drawings forming a part thereof, in which.

Figure 1:
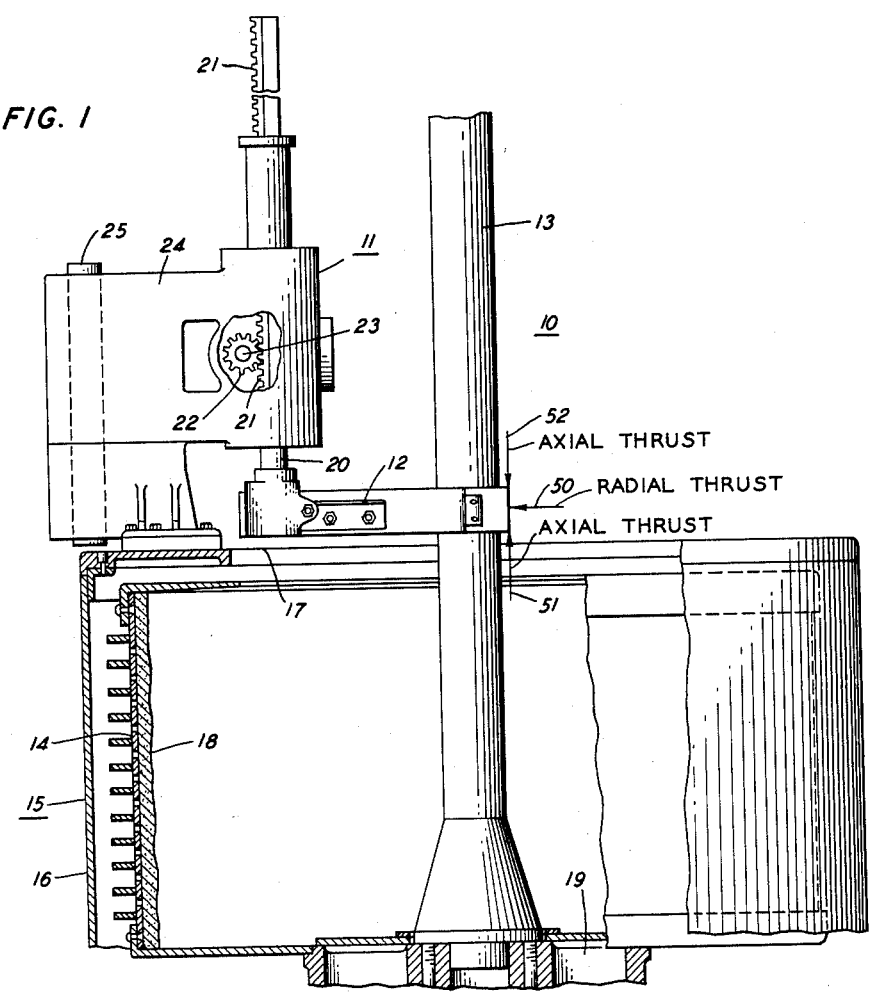
FIG. 1 is an elevation view, with portions broken away, of a portion of a centrifugal basket and an unloader arrangement including a composite plow in accordance with the invention.
Figure 2:
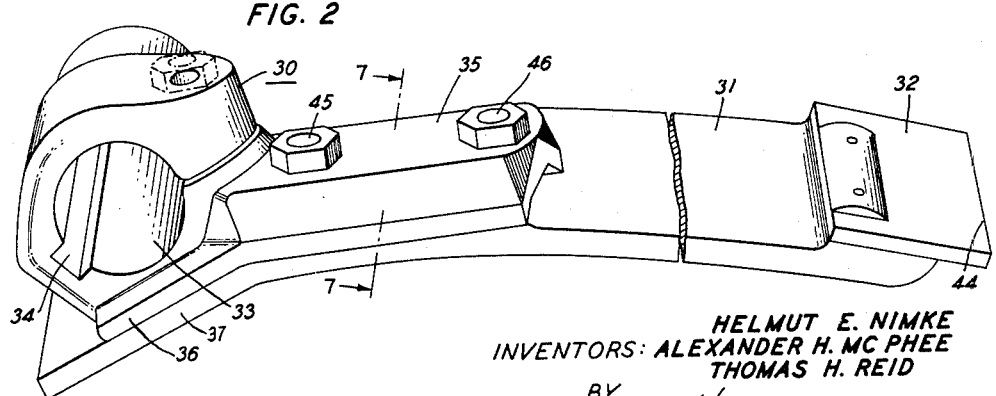
FIG. 2 is a perspective view of the composite plow of the invention.
Figure 3:
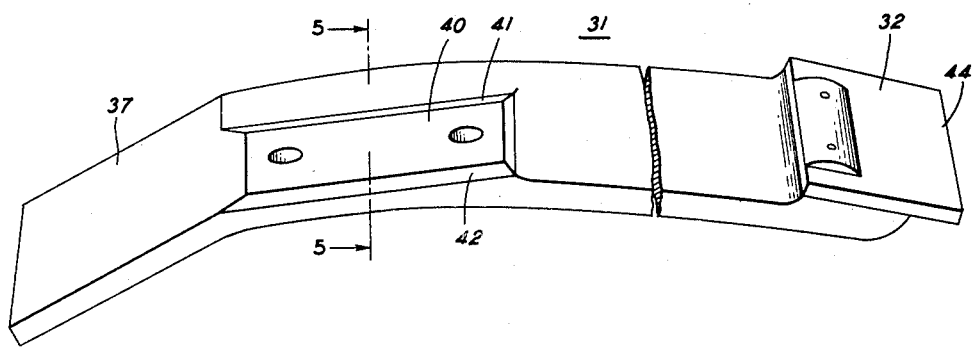
FIG. 3 is a perspective view of the plow member of the composite plow of this invention.
Figure 4:
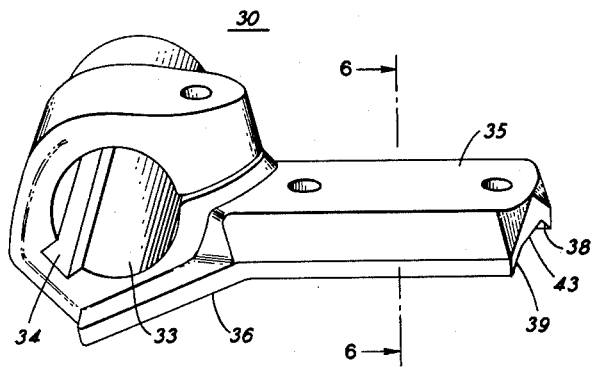
FIG. 4 is a perspective view of the hub member of the composite plow.
Figure 6:
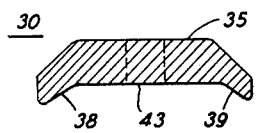
FIG. 6 is a cross-sectional view taken in a plane through line 6—6 in FIG. 4.
Figure 5:
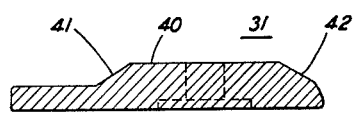
FIG. 5 is a cross-sectional view of a portion of the plow member of FIG. 3, the view being taken in a plane through lines 5—5 thereof.

Referring more particularly to the drawings, FIG. 1 shows, by way of example for purposes of illustration, a sugar centrifugal 10 having an unloader arrangement 11 employing a composite plow 12 in accordance with the invention. The centrifugal comprises a rotatable vertical shaft or spindle 13 adapted to be driven by any suitable means such as an electric or hydraulic motor (not shown) mounted above it. Suspended from the spindle is a perforated basket 14 having a stationary outer casing or curb 15. This curb has a cylindrical side wall 16, a top 17, and a bottom (not shown) which can be provided, in a manner well known, with suitable annular troughs to carry away the various liquids ejected from the basket 14 during the centrifuging process. As is well known, massecuite or magma is placed in the basket and the latter is rotated at high speed for several minutes causing green syrup to be thrown through the apertures in the basket, striking the curb wall and flowing down its sides to the annular troughs below. Washing fluid can then be introduced and the wash syrup (possibly mixed with a little green syrup) is also caused to strike the curb wall and is collected below. This centrifuging process leaves a wall of sugar grains 18 on the inside of the basket 14. In order to remove this sugar and permit it to pass through a central opening 19 in the bottom of the basket (which opening may be covered during the centrifuging process), the plow 12 is provided. This plow is fastened and keyed to the lower portion of a vertical shaft or rack 20 which has teeth 21 cut therein. These teeth mesh with those of a gear 22 mounted on a pinion shaft 23. This shaft 23 can be turned by a suitable handle (not shown) to raise and lower the plow 12 within the basket. This shaft is mounted on a frame 24 which is pivoted about a vertical shaft 25 making it possible to move the plow 12 into the sugar wall 18. The manner in which the plow is moved up and down in the basket and into and out of the sugar wall is well known in the art so will not be described in greater detail here.

Reference will now be made to FIGS. 2 through 7, inclusive, to explain the details of the composite plow structure 12 in accordance with the invention. As explained above, a plow is often broken during the plowing operation because it must be deliberately made the weakest structural link in the system so that the centrifugal basket with its accompanying screen is not subjected to damage during plowing overloads. For maximum economy and efficiency, in the present invention the plow structure 12 is made in more than one part, with one part, the one requiring no machining, made of weaker material than the other. More specifically, the plow 12 comprises a machined hub member 30 of strong material such as, for example, and a plow member 31 of weaker material, such as cast iron, for example, and which need have no machined surfaces. The plow member 31 carries the customary plow tip 32 as in prior art plow structures which have a combined hub and plow member.

The hub member 30 has a machined sleeve surface 33 to encircle the plow rod 20 and a keyway 34 therein to receive a key (not shown) to prevent rotation between the members 20 and 30. The hub member 30 (see FIG. 4) also has a coupling portion 35 for bolting it to the plow member 31 and a planar contacting portion 36 adapted to be contiguous to a corresponding contacting portion 37 of the plow member 31. The underside of the coupling portion 35 has two angularly positioned plane surfaces 38 and 39.

The plow member 31 (see FIG. 3), in addition to the contacting portion 37, has a raised surface 40 with two angularly positioned planar sides 41 and 42 which are adapted to make contact with the plane surfaces 38 and 39 of the hub member 30. The underside 43 of the hub member 30 does not make contact with the surface 40 of the plow member 31 for a reason which will be given below.

As explained above, there are two lines of thrust on the plow. The first, the line of the radial thrust, is represented by the arrow 50 in FIG. 1, while the second, the line of the upward and downward or axial thrusts, is represented by the arrows 51 and 52 in this figure.

In order to properly resist the radial thrust in the direction 50 without relative motion between the hub 30 and the plow rod 20, the contact planes 36 (of member 30) and 37 (of member 31) are arranged in planes set at an angle to this thrust. They make a compressive contact when they are engaged.

Figure 7:
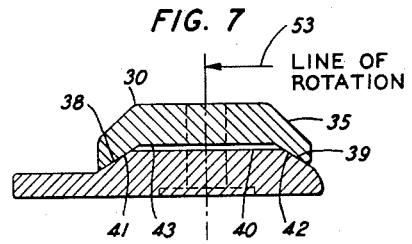
FIG. 7 is a cross-sectional view taken in a plane through line 7—7 of FIG. 2 showing the manner in which the plow member and the hub member are fitted together.

The upward and downward axial forces relative to the plow rod 20, in line with the long front edge 44 of the plow tip 32 as it moves up or down the sugar wall 18 in the basket 14, tend to bend the plow about the line of rotation 53 (see FIG. 7) which is a line substantially perpendicular to and through the center of face 40 (see FIG. 7). To resist this rotation, the two contact faces 41 and 42 of member 31, which contact corresponding faces 38 and 39 of member 30, are arranged at an angle to this line of rotation and to face 40. The latter face is not a contact face (it does not touch face 43 of member 30) and thus serves only the function of connective material to hold the bolts 45 and 46. Because of this, the two members 30 and 31 are assured a firm compressive contact when bolted together. As a result of this arrangement, the bolts are loaded only in tension due to the bolt clamping force. The principal operating loads are taken in compression on the contact faces, as explained.

It will be readily apparent that in the plow structure described herein there is provided a system of planes sharing edges and arranged so as to be oriented in planes skew to the principal forces on the system.

Moreover, in event of breakage, the only part to be replaced is the plow member 31, a casting on which no machine work is required. The hub member 30, the more expensive item since it involves machining, is made of higher strength material and would therefore not require replacement in case of plow breakage.

Obviously, various changes can be made in the embodiment described herein without departing from the spirit of the invention, as indicated in the claims.

What is claimed is:

1. A plowing mechanism to unload a centrifugal machine which includes a vertical bar carrying the plowing mechanism and means for moving said bar vertically, said plowing mechanism comprising a hub member attached to said vertical bar, a plow member attached to said hub member, and a plow tip attached to said plow member, said plow member having a frangible portion which is strong enough to carry ordinary plowing forces but which is adapted to break when subjected to plowing overload.

2. The combination of elements as in claim 1 in which said frangible portion is of weaker material than is said hub member.

References Cited in the file of this patent
UNITED STATES PATENTS

| | | |
|---|---|---|
| 1,105,444 | Lougher | July 28, 1914 |
| 1,205,128 | Mackintosh | Nov. 14, 1916 |
| 2,064,766 | Roberts | Dec. 15, 1936 |
| 2,742,658 | Sproston | Apr. 24, 1956 |
| 2,752,044 | Olcott | June 26, 1956 |
| 2,953,250 | Jung et al. | Sept. 20, 1960 |